(12) United States Patent
Surajit et al.

(10) Patent No.: US 11,777,304 B2
(45) Date of Patent: Oct. 3, 2023

(54) HIGH VOLTAGE PROTECTION SYSTEM

(71) Applicant: TVS MOTOR COMPANY LIMITED, Chennai (IN)

(72) Inventors: Das Surajit, Chennai (IN); Geddadi Krishnamohan, Chennai (IN); Samraj Jabez Dhinagar, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 53 days.

(21) Appl. No.: 17/593,778

(22) PCT Filed: Mar. 20, 2020

(86) PCT No.: PCT/IN2020/050262
§ 371 (c)(1),
(2) Date: Sep. 24, 2021

(87) PCT Pub. No.: WO2020/194342
PCT Pub. Date: Oct. 1, 2020

(65) Prior Publication Data
US 2022/0190588 A1     Jun. 16, 2022

(30) Foreign Application Priority Data
Mar. 26, 2019   (IN) .............................. 201941011833

(51) Int. Cl.
*B60L 50/11* (2019.01)
*H02H 3/20* (2006.01)
(Continued)

(52) U.S. Cl.
CPC ............... *H02H 3/202* (2013.01); *B60L 3/04* (2013.01); *B60L 50/11* (2019.02); *B62J 43/16* (2020.02);
(Continued)

(58) Field of Classification Search
CPC .......... H02H 3/202; H02H 3/20; H02H 3/243; H02H 3/44; H02H 3/00; H02H 9/04;
(Continued)

(56) References Cited

U.S. PATENT DOCUMENTS 10,193,330 B1 * 1/2019 Bartz .................. H02H 7/0851
2015/0015137 A1   1/2015 Kang
2017/0054438 A1 * 2/2017 Handy .................... H02H 3/05

FOREIGN PATENT DOCUMENTS

GB        2278935 A    12/1994

OTHER PUBLICATIONS

International Search Report issued in corresponding International Application No. PCT/IN2020/050262 dated Jun. 17, 2020 (3 pages).
(Continued)

*Primary Examiner* — Danny Nguyen
(74) *Attorney, Agent, or Firm* — Osha Bergman Watanabe & Burton LLP (57) ABSTRACT

A high voltage protection system for saddle type vehicle detects the short circuiting of any wire. The high voltage protection system provides three different modules: a high voltage protection circuit, a fault collection circuit, and a fault detection circuit, working together to detect the short circuiting or voltage spike and disconnect the vehicle loads from the power supply to prevent an accident.

9 Claims, 7 Drawing Sheets

(51) Int. Cl.
    *B62J 43/16*     (2020.01)
    *B60L 3/04*     (2006.01)
    *H02H 7/12*     (2006.01)

(52) U.S. Cl.
    CPC ........ H02H 7/1213 (2013.01); *B60L 2200/12* (2013.01); *B60L 2210/10* (2013.01)

(58) Field of Classification Search
    CPC ........ B60L 3/04; B60L 50/11; B60L 2200/12; B62J 43/16
    USPC ....................................................... 361/91.1
    See application file for complete search history.

(56) References Cited

OTHER PUBLICATIONS

Written Opinion of the International Searching Authority issued in corresponding International Application No. PCT/IN2020/050262 dated Jun. 17, 2020 (6 pages).

\* cited by examiner

HIGH VOLTAGE PROTECTION SYSTEM

TECHNICAL FIELD

The present subject matter generally relates to a vehicle. More particularly but not exclusively the present subject matter relates to a high voltage protection system in the vehicle.

BACKGROUND

In electric and hybrid vehicle, the batteries, which are used are generally of voltage greater than 12V, which may supply power to the traction motor requiring high voltage and also at the same time provides power to the low voltage loads such as switches, head lamp, tail lamps, horn. Hence, a DC-DC converter is used to step down the voltage to 12V or 5V for low voltage loads. Signal conditioning circuits are generally designed for a maximum 12V system.

In case of electric or hybrid vehicles there may be two types of cord sets. One cord set is of high voltage and another cord set of low voltage. The routing of the cord set can be carefully done so that one cord set does not interfere with other cord set and also during the time of servicing it becomes easy to detect any fault and correct it. Another way of arranging high voltage cord set and low voltage cord set is by arranging them together at certain locations. This type of arrangement may be required based on the design of the vehicle. Both high voltage cord set and low voltage cord set runs parallel along the vehicular frame. Generally, in order to protect the low voltage cord set from any interference, thermal runaway, spikes or fire hazard the high voltage cord set both type of cord sets are provided with rubber cover or plastic cover or at times fabric cover.

DETAILED DESCRIPTION

When high voltage cord set and low voltage cord set are routed together at certain location in a vehicle, when the requirement demands, the susceptibility of the low voltage cord set getting effected due to high voltage cord set increases. Due to environmental factor such as light, heat, resistance or unwanted elements like rodents may damage the cord set. This may lead to the wires with in the high voltage cord set and low voltage cord set getting exposed to dangers like short circuiting due to the proximity of the exposed wires.

The input switches from plurality of loads connected to the signal conditioning circuit if not protected from the high voltage due to short circuit the signal conditioning circuit and the microcontroller may fail. The electronic control unit (ECU) comprising the signal conditioning unit and the microcontroller needs replacement in case of damage and hence that spikes the cost of replacement as the entire ECU along with the microcontroller may need replacement.

Hence, the present subject matter provides a system to detect a short circuit and prevent the signal conditioning circuit from short circuit by disabling the vehicle. This enables the user of the vehicle to know that if any of the wire getting short to a high voltage of 48V or more wire & thereby ensure safety of his own & any potential fire accident on the vehicle.

Another aspect of the present subject matter provides an ECU (electronic control unit) which can detect the short circuit between high voltage wire and one or more input switches having a high voltage battery for traction purpose with non-isolated designed electronic control unit (ECU).

Another embodiment of the present subject matter is to provide a system for plurality of modules working in synergistic manner and to distinguish from several input which may get short circuited. First module consists of a high voltage protection circuit to detect if any spike in voltage occurs in any of the input switches. Second module comprises a fault collection circuit comprising plurality of input switches from several loads and checks whether any fault has occurred in any of the input switch. Third module comprises a fault detection circuit in which the input voltage received from the second module is compared with a threshold voltage. The high voltage protection circuit provides input to the fault collection circuit and the fault detection circuit gets input from the fault collection circuit.

Another aspect provides a high voltage protection circuit which comprises a reverse biased semiconductor device such as a Zener diode. When the input voltage increases beyond a certain value (depending on the Zener breakdown voltage) which may cause damage to the circuit, a Zener diode potential barrier (carefully chosen according to the input signal voltage value) breaks down and the power gets transferred to the zero potential ground terminal thereby protecting the circuit from any voltage spike.

Another embodiment of the present subject matter provides a fault collection circuit which is responsible for stepping down the voltage and then filtering out the noise accompanying signal received from any of the plurality of input switches.

Another embodiment of the present subject matter provides fault detection circuit which receives an output from the fault collection circuit and then the voltage of the received output from the fault collection circuit is compared with a threshold voltage generated by a threshold voltage generating circuit. In normal operating condition the fault collection unit receives 12 volts (or less) input from the input switches when any of the switches are turned ON. In case of short circuit condition the fault collection circuit receives high voltage like 48 volts or more.

These and other advantages of the present subject matter would be described in greater detail in conjunction with an embodiment of a scooter type two wheeled vehicle with the figures in the following description.

Figure 1:
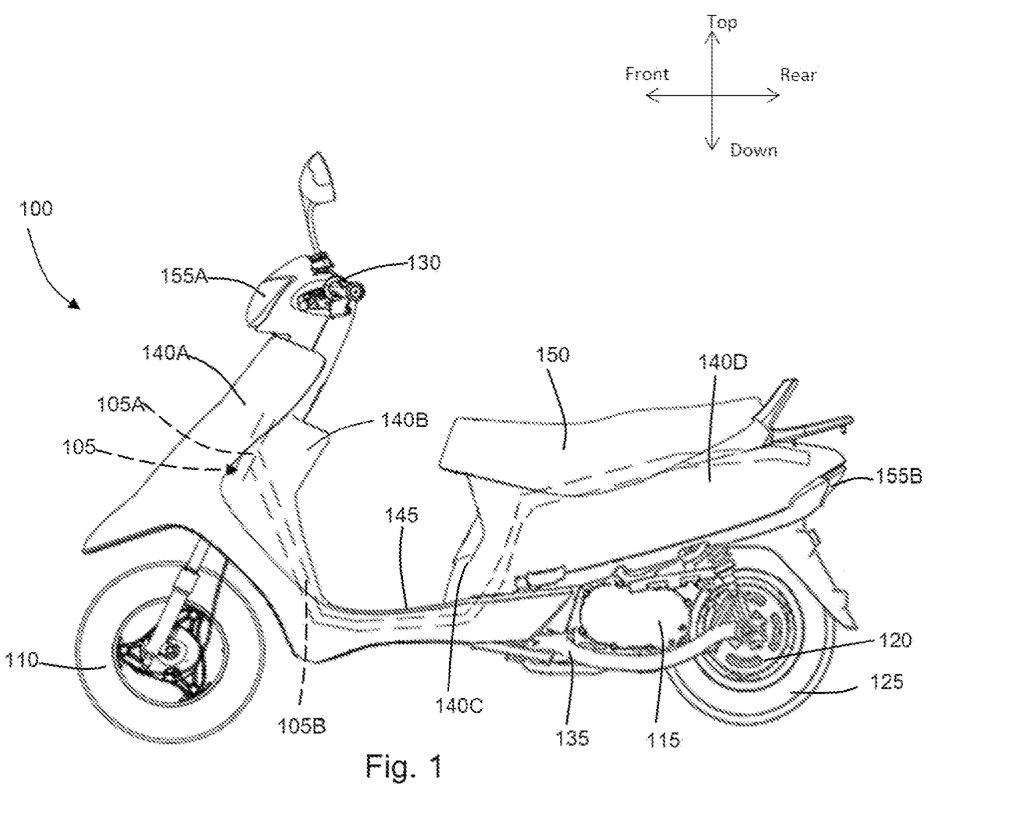
FIG. 1 illustrates an exemplary vehicle with a left side view which incorporates the present subject matter.

FIG. 1 illustrates a left side view of an exemplary motor vehicle (100), in accordance with an embodiment of the present subject matter. The vehicle (100) illustrated, has a frame member (105). In the present embodiment, the frame member (105) is step-through type including a head tube (105A), and a main frame (105B) that extend rearwardly downward from an anterior portion of the head tube (105A). The main frame (105B) extends inclinedly rearward to a rear portion of the vehicle (100).

The vehicle (100) includes one or more prime movers that are connected to the frame member (105). In the present implementation, one of the prime movers is an internal combustion (IC) engine (115) mounted to the frame member (105). In the depicted embodiment, the IC engine (115) is mounted to a structural member (135) that is pivoted to the frame member (105). In one embodiment, the structural member (135) is a rigid member made including metal. The vehicle (100) also includes another prime mover, which is an electric motor (120). In a preferred embodiment, the electric motor (120) is hub mounted to one wheel of the vehicle (100). In another embodiment, one or more than one electric motor is mounted to wheels or to the frame of the vehicle. In the depicted embodiment, the vehicle (100) includes at least two-wheels and the electric motor (120) is hub mounted to the rear wheel (125) of the vehicle. A front wheel (110) is rotatably supported by the frame member (105) and is connected to a handle bar assembly (130) that enables maneuvering of the vehicle (100).

Further, the vehicle (100) includes a high capacity on-board battery (not shown) that drives the electric motor (120). The high capacity battery may include one or more high capacity battery packs or one or more low capacity cells. The high capacity battery can be disposed at a front portion, a rear portion, or at the center of the vehicle (100). The high capacity battery is supported by the frame member (105) and the vehicle (100) includes plurality of body panels, mounted to the frame member (105) for covering various components of the vehicle (100). The plurality of panels includes a front panel (140A), a leg shield (140B), an under-seat cover (140C), and a left and a right-side panel (140D). A glove box may be mounted to a leg shield (140B).

A floorboard (145) is provided at the step-through portion defined by the main tube (105B). A seat assembly (150) is disposed rearward to the step-through portion and is mounted to the main frame (105B). The seat assembly (150) that is elongated in a longitudinal direction F-R of the vehicle (100) enables the user to operate the vehicle in a saddle ride-type posture. One or more suspension(s) connect the wheels (110), (125) to the vehicle (100) and provide a comfortable ride. The vehicle (100) comprises of plurality of electrical and electronic components including a headlight (155A), a taillight (155B), a starter motor (not shown), a horn etc. Also, the vehicle (100) includes a master control unit (not shown) that takes control of the overall operation of the vehicle (100) including the function of the IC engine (115), the electric motor (120), charging of the batteries from a magneto/integrated starter generator (ISG), driving of loads by the magneto/ISG, charging of the high capacity batteries by the electric motor operating in generator mode, and any other operations associated with the operation of the vehicle (100). The vehicle (100) shown in FIG. 1 is an exemplary vehicle and the present subject matter can be used in a two-wheeled vehicle, three-wheeled vehicle or a four-wheeled vehicle.

Figure 2:
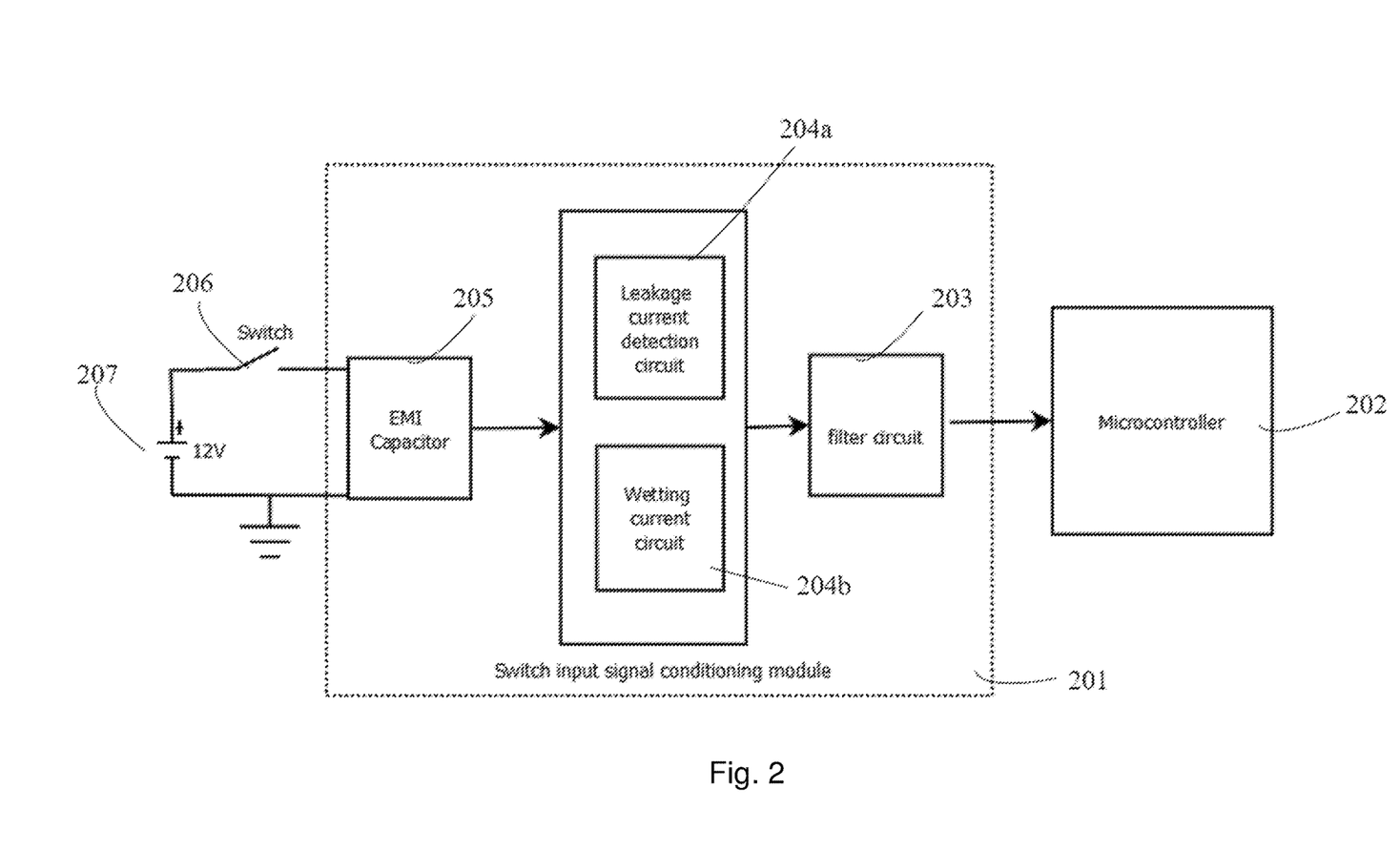
FIG. 2 illustrates a block diagram depicting the prior art which has disadvantages.

FIG. 2 illustrates a prior art depicting 12 V system signal conditioning module (201). Usually, signal conditioning module (201) comprises an EMI (electromagnetic interference) suppressor capacitor (205) which takes input after a main switch (206) gets closed. The input voltage consists of noise. The EMI suppressor capacitor (205) removes the electromagnetic interference or the noise caused by external factor or when the high voltage cord set causes disturbance in the functioning of the low voltage cord set. The input voltage further goes to leakage current detection circuit (204a) and the wetting current circuit (204b). The leakage current detection circuit (204a) used to detect current leakage which may occur due to salt water or mud or any other automotive liquids. The wetting current circuit (204b) is responsible to remove any oxidation layer formed on the contact area due to moisture. The resistance of the switch in an ON condition may change based on the environmental conditions e.g. during high moisture condition, a thin film of oxide forms on the contacts which results in increase in the resistance. If the same switch comes in contact with a moisture containing salt then the resistance of the switch decreases during OFF condition. Such variation of unnecessary resistance severely affects the operation of devices such as braking system and may cause draining of the battery respectively. A filter circuit (203) has been provided to filter out any noise from the signal prior sending it to the microcontroller (202).

Typically, in a switch OFF state resistance in salt water condition is little higher compared to the resistance in moisture condition in an ON state. Hence, it becomes necessary to differentiate between a switch ON condition and a switch OFF condition. Therefore, the circuit is designed to withstand a high voltage the overall loss would increase by introducing high resistance. If the circuit needs to withstand the high voltage (~48V) then power loss increases as the requirement for the resistor increases. The power requirement for the resistor increases and high power requires bigger package (size) than the low power resistor which results in the increase in overall size of the circuit and the cost of the system. And without the incorporation of suitable resistor for protection, the spike in the voltage may damage the signal conditioning circuit and the microcontroller (202).

Figure 3:
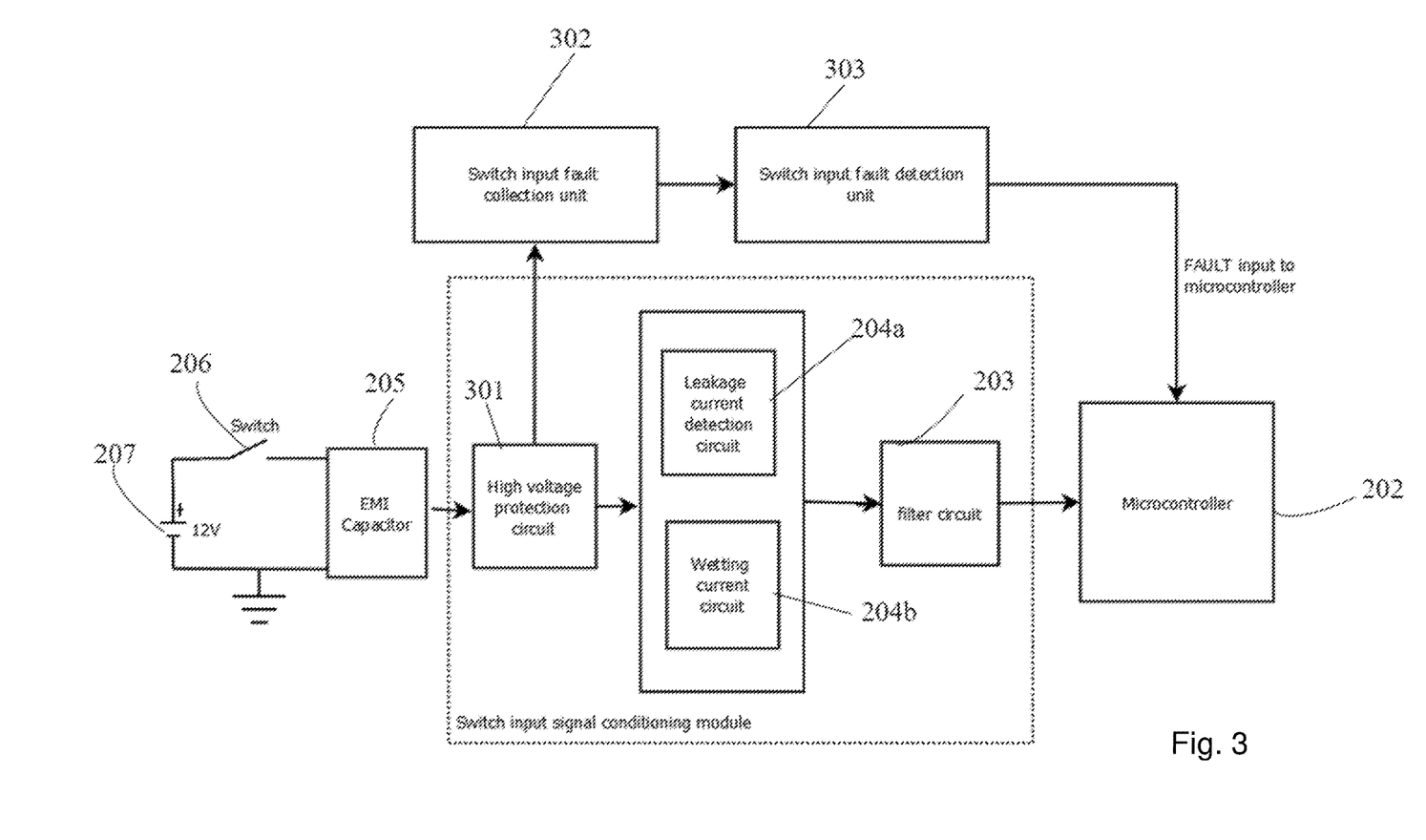
FIG. 3 illustrates a block diagram of the present subject matter overcoming the drawbacks in the prior art.

FIG. 3 illustrates the present subject matter which overcomes the problems in the prior art described in FIG. 2. The battery (207) supplies the current when the main switch (206) gets closed. The current signal is then filtered with the help of EMI suppressor capacitor (205) which removes any electromagnetic interference in the current signal. The filtered voltage signal is then transferred to high voltage protection circuit (301) which is primarily used to disconnect the signal conditioning circuit from the input source in case there is any unnecessary spike in the voltage signal. The signal conditioning circuit is connected to the battery (207) through the EMI capacitor (205) and the high voltage protection circuit (301) by closing the main switch (206). The next module is a fault collection circuit (302) provided with one or more input switches configured to receive input from one or more loads provided in the vehicle (100). The circuit; irrespective of the ON or OFF status of any of the switches, if any one input switch receives voltage signal; the fault collection circuit (302) starts conducting. This voltage signal is made to step down through a voltage divider circuit comprising plurality of resistors and then the reduced voltage is fed to the third module comprising a fault detection circuit (303). The high voltage protection circuit (301) protects the vehicle's electric circuit from any spike in voltage when the vehicle is running in engine mode as the generated voltage varies constantly. But there is always a chance that other loads present in the vehicle, even though working at low voltage (~12V), may form a short circuit with any other wire, provided in the vehicle. Therefore, it becomes important to protect the vehicle's electric circuit and other cable from such short circuiting which leads to sudden spike in the voltage and may result to severe damage to the electric components or an accidental fire. The fault collection circuit (302) receives input from several loads and in case if a short circuit happens, at least one of the input switch (501,502,503,504) sends the high voltage to the fault collection circuit (302) which steps down the input voltage by a considerable amount and the high voltage is being stepped down and then fed to the fault detection unit (303). The received input voltage, by the fault detection circuit (303), is compared with a threshold voltage by a comparator (601)(not shown). If the received input voltage (from fault collection unit) is still greater than the predetermined/threshold voltage set in the microcontroller, the vehicle gets disabled by the microcontroller (202).

In the last stage, a fault detection circuit (303) receives the output from the fault collection circuit (302) and then compares it with a threshold voltage generated by a threshold voltage generator circuit.

Figure 4:
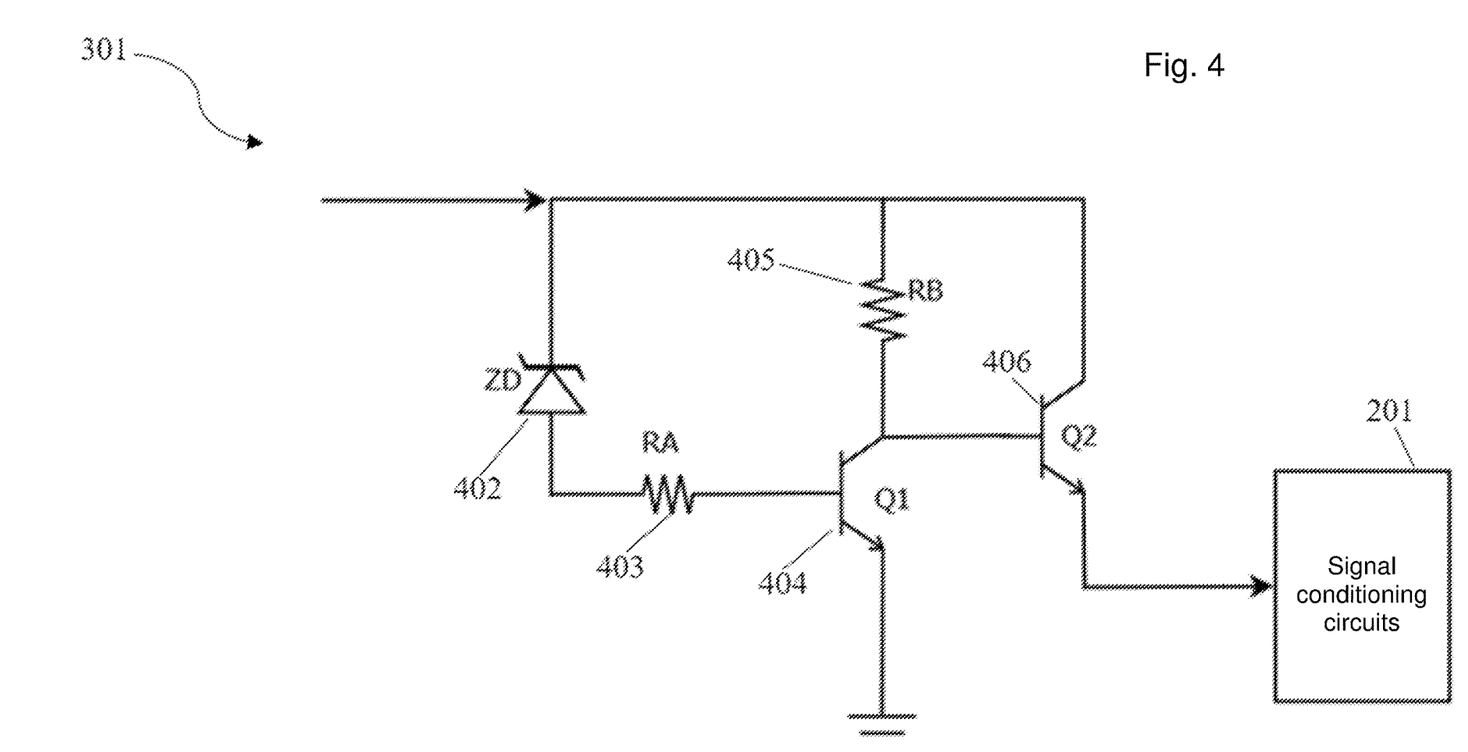
FIG. 4 illustrates a circuit level diagram of the high voltage protection circuit of the present subject matter.

FIG. 4 provides a circuit level diagram of high voltage protection circuit (301). The high voltage protection circuit (301) is provided with an input voltage by closing the main switch (206). The main switch (206) allows the current to flow in the direction of bipolar junction transistors (Q1 and Q2). The bipolar junction transistor current is limited by providing base current limiting resistors (Ra, Rb). First base resistor (403) controls the current flow in the direction of the base terminal of the first bipolar junction transistor (404) and the second base resistor (405) controls the current flow in the direction of the base terminal of the second bipolar junction transistor (406). The second bipolar junction transistor (406) allows the current to flow into one or more signal conditioning circuit. The bipolar transistor as per an embodiment is an NPN transistor.

The collector terminal of the first bipolar junction transistor (404) is connected to a second base resistor (405) and also connected to the base of second bipolar junction transistor (406) and the emitter terminal of the first bipolar junction transistor (404) is connected to a zero potential ground terminal. Whereas the emitter terminal of the second bipolar junction transistor (406) is providing a controlled current to one or more signal conditioning circuits (201) which is/are configured to electronic components such as a microcontroller (202) (shown in FIG. 3). The collector terminal of the second bipolar junction transistor (406) is connected to an input switch. The high voltage protection circuit (301) is provided with a Zener diode (402) to perform an essential function of protecting the circuit from high voltage after the input voltage provided from the input switch crosses the Zener breakdown voltage. The threshold voltage can be set by choosing a suitable Zener diode (402) having a particular reverse break down voltage according to the requirements of the circuit. The negative terminal of the Zener diode (402) is configured to receive the input voltage when the main switch (206) is closed whereas the positive terminal of the zener diode (402) is electrically connected to the first base resistor (403).

When input voltage is provided to the high voltage protection circuit (301) during closed condition of the main switch (206), the current starts flowing in the direction of the second base resistor (405). The second bipolar junction transistor (406) gets activated by receiving a controlled base current. The first bipolar junction transistor (404) remains in an OFF state while the second bipolar junction transistor (405) continues to conduct. The Zener diode (402) prevents the flow of current to the first bipolar junction transistor (404) due to the reverse biased voltage barrier (Vz) of the Zener diode (402). The Zener diode (402) works as switch which remains OFF up to its reverse breakdown voltage and gets ON and starts conducting when the reverse breakdown voltage barrier (Zener diode voltage, Vz) gets crossed due to spike in the input voltage.

When there is any surge in the input voltage and the input voltage crosses the Zener reverse breakdown voltage then the current starts rushing in the direction of the first bipolar junction transistor (404). At this stage the second bipolar junction transistor (406) stops conducting current and gets turned OFF and thereby protects one or more signal conditioning circuits which are susceptible to any voltage fluctuation. When first bipolar transistor (404) is an ON state then the second bipolar transistor (406) remains in an OFF state. When one bipolar transistor is in ON state the other bipolar transistor remains in an OFF state and vice-a-versa. None of the bipolar transistor can have same state, depending on the input voltage the state of both the bipolar transistor changes.

When the input voltage crosses the Zener reverse breakdown voltage then the Zener diode starts conducting and the current flows to the ground terminal through first bipolar junction transistor (404). The base terminal of the first bipolar junction transistor (404) allows a small amount of current to flow to the second bipolar junction transistor (406).

Figure 5:
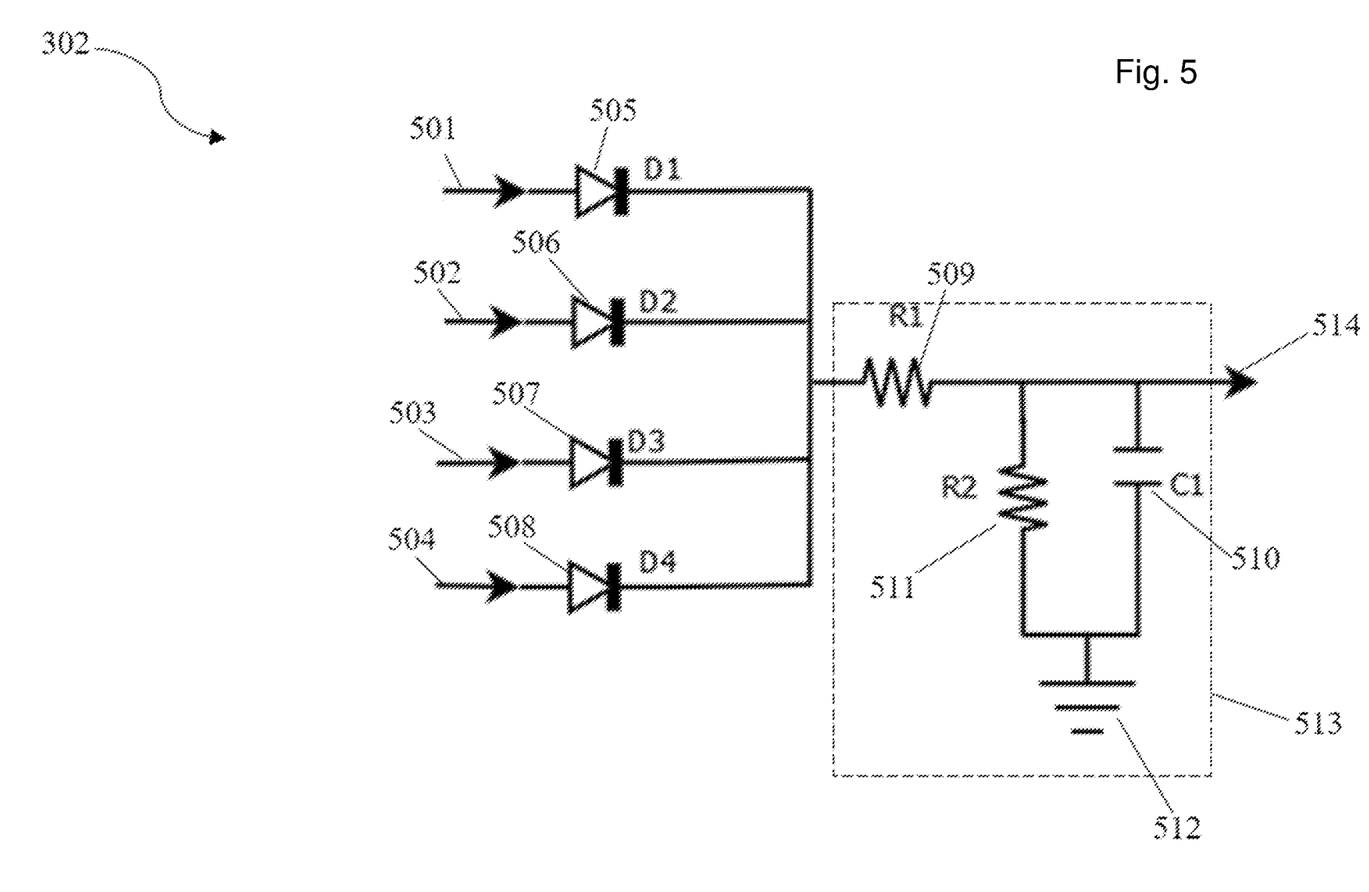
FIG. 5 illustrates a circuit level diagram of the switch input fault collection unit of the present subject matter.

FIG. 5 provides a fault collection circuit (302). The fault collection circuit (302) comprises plurality of semiconductor device such as a unijunction diode. The unijunction diodes (505,506,507,508) are positive biased with p-type region receiving the input from one or more input switches (501,502,503,504) connected to one or more loads of the vehicle. The n-type region of plurality of unijunction diode (505,506,507,508) are tied together and the voltage at the n-type region or the cathode terminal is equal to maximum voltage at the anode terminal (p-type region) minus the barrier voltage across the unijunction diode i.e. 0.7 Volt for a silicon diode and 0.3 for a germanium diode. The unijunction diode (505,506,507,508) used in the fault collection circuit (302) is PN junction diode. The plurality of unijunction diodes (505,506,507,508) are connected in forward bias condition with a very high reverse blocking voltage (much higher than the battery voltage) and thus it prevents any flow of current when the plurality of the unijunction diodes (505,506,507,508) are connected in reverse direction.

The n-type region or the cathode terminals of the plurality of unijunction diodes (505,506,507,508) are connected to a potential divider circuit (513) with a low pass filter respectively. The bridge resistor (509) connects the plurality of the unijunction diodes (505,506,507,508) to the potential divider circuit (513) comprising a parallel configuration of a resistor and a capacitor. The voltage is stepped down on the basis of the ratio of bridge resistor (509) and the low pass filter resistor (511) (ratio=R2/R1). The input voltage applied to the plurality of the unijunction diode (505,506,507,508) also accompanies spikes and noises which gets filtered out by a capacitor (510) of the potential divider circuit (513). The capacitor (510) allows voltage of low frequency to pass through the switch fault collection circuit (302).

The low pass filter resistor (511) and bridge resistor (509) are carefully selected such that the output of the fault collection circuit (302) is always lower than the threshold voltage for detecting any fault.

Figure 6:
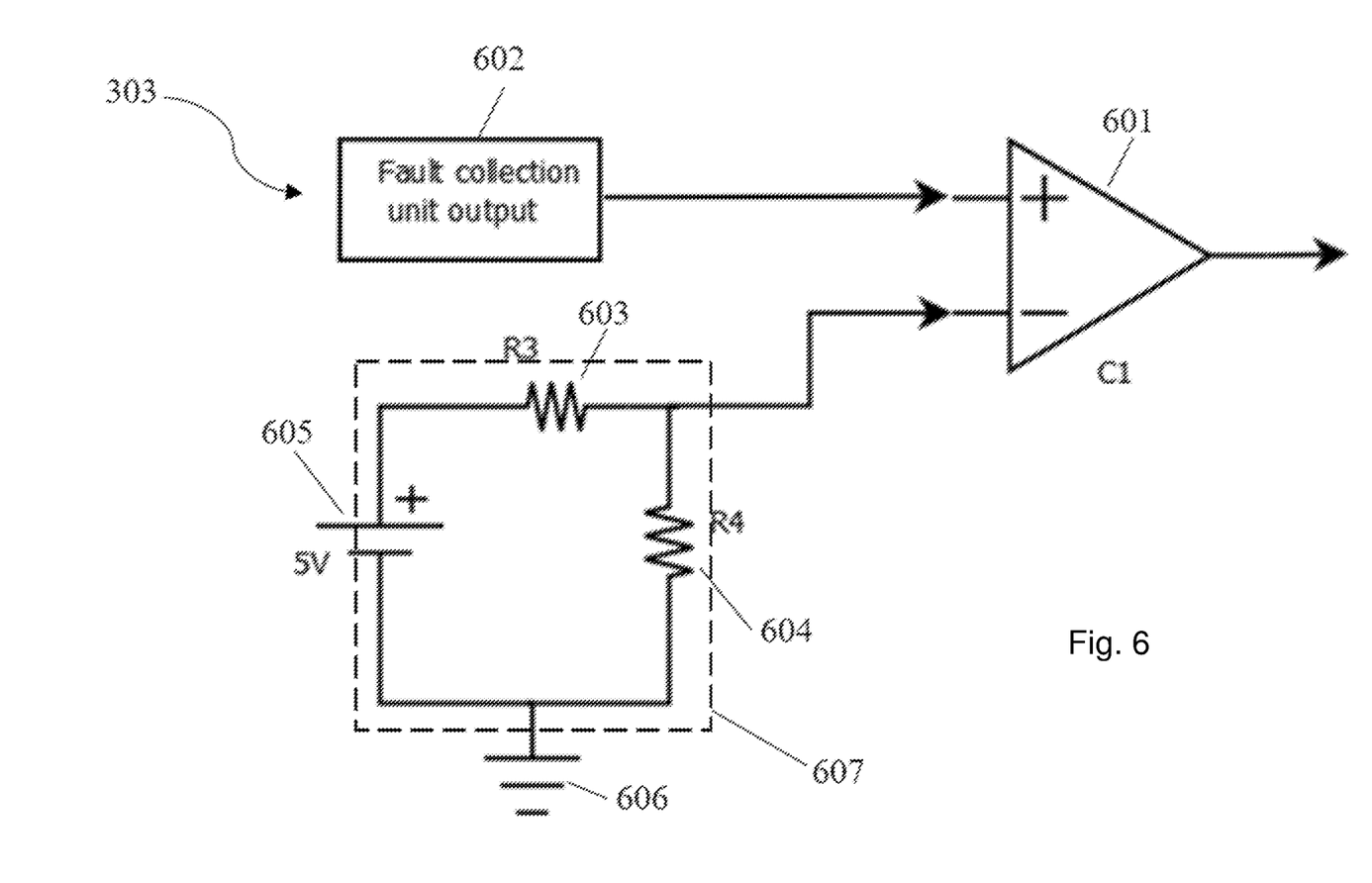
FIG. 6 illustrates a circuit level diagram of the switch input fault detection unit of the present subject matter.

In case of high voltage (~48 Volt or greater) the high voltage is being stepped down and then fed to the fault detection unit (ref. FIG. 6). Similarly, if there is a high voltage short circuit any of the plurality of the diodes (505,506,507,508), irrespective of switch status as ON or OFF, the high voltage (48V or more) gets connected to one of the plurality of diodes (505,506,507,508) and then the high voltage is made to step down and fed to the fault detection circuit (303).

FIG. 6 provides fault detection circuit (303). Fault detection circuit (303) detects any spike in the voltage. The fault detection circuit (303) comprises a comparator (601) to compare the output coming from the fault collection circuit (302) with a threshold voltage generated from the threshold voltage generator circuit (607). The output received from the fault collection circuit (302) is configured to a positive terminal of the comparator (601) and the threshold voltage is fed from a threshold voltage generator circuit (607) to a negative terminal of the comparator (601).

The threshold voltage generator circuit (607) comprises a voltage source (605) such as a battery and fault detection resistors (603,604). The fault detection ratio (R3/R4) of the fault detection resistors (603,604) decides the value of the threshold voltage.

Figure 7:
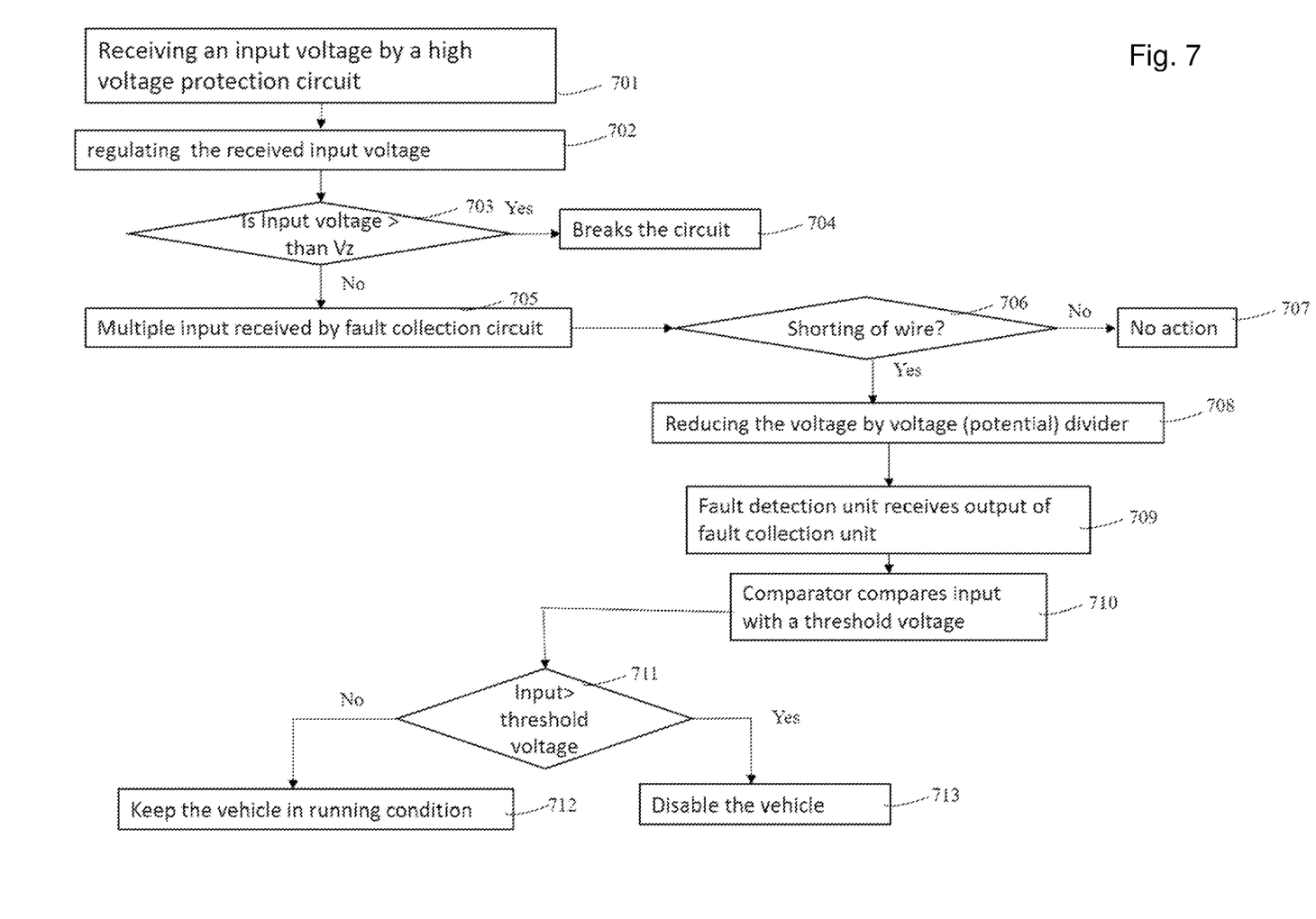
FIG. 7 illustrates a method of performing the present subject matter in a flow chart.

FIG. 7 provides the method of high voltage protection system for a saddle type vehicle. The first module that is the high voltage protection circuit (301) and an input voltage signal is being received by the high voltage protection circuit (301) in step 701. The received input voltage signal is being regulated by the Zener diode of the high voltage protection circuit (301). When the input voltage signal is being compared with a Zener diode voltage (Vz) in step 702, if it is greater than the Zener voltage the circuit breaks in order to prevent damage from high voltage (step 704). If not, then the fault collection circuit (302) receives plurality of inputs in step 705 from several loads in the vehicle. In step 706, it is checked whether there is any short circuit or not. If there is no short circuit, then no action takes place (step 707). But during a short circuit, voltage divider reduces the voltage by considerable amount (in step 708). In step 709, fault detection unit received input from the fault collection unit. A comparator compares input with a threshold voltage in step 710. If the input is greater than the threshold voltage, then a microcontroller disables the vehicle in step 713 otherwise the vehicle remains in running condition (or no change in condition of the vehicle) (step 712).

In normal working condition the input received from the fault collection circuit remains less than the threshold voltage. Whereas in abnormal condition the input received from the fault collection circuit becomes more than the threshold voltage which can damage the circuitry.

We claim:

1. A high voltage protection system for a saddle type vehicle comprising:
    a switch input signal conditioning module comprising an electromagnetic interference suppressor capacitor to eliminate electromagnetic interference signals from an input power received from a power source and to provide a filtered voltage signal,
        wherein, said electromagnetic interference suppressor capacitor is electrically configured to a leakage current detection circuit and a wetting current circuit;
    a filter circuit enabling said filtered voltage signal to be transferred to a microcontroller;
    a high voltage protection circuit configured to receive said filtered voltage signal;
        wherein, said high voltage protection circuit electrically connects said electromagnetic interference suppressor capacitor and said leakage current detection circuit and said wetting current circuit; and
    a fault collection circuit electrically configured to said high voltage protection circuit and a fault detection circuit,
        wherein, said fault collection circuit is configured to receive one or more input signals, from one or more input switches connected to one or more loads in said vehicle, to step down said one or more input signals;
        wherein, said fault detection circuit is configured to receive said stepped down said one or more input signals as an output from said fault collection circuit; and
        wherein, said output from said fault collection circuit is compared to a threshold voltage and fed to the microcontroller; and said microcontroller disable said vehicle when said output from said fault collection circuit is greater than said threshold voltage.

2. The high voltage protection system for a saddle type vehicle as claimed in claim 1, wherein said high voltage protection circuit being provided with a pair of bipolar junction transistors controlled by a Zener diode.

3. The high voltage protection system for a saddle type vehicle as claimed in claim 1, wherein said one or more input switches being electrically connected to a potential divider circuit to step down a voltage received as said one or more input received from said one or more input switches.

4. The high voltage protection system for a saddle type vehicle as claimed in claim 3, wherein each of said one or more input switches are electrically configured to at least one unijunction diode.

5. The high voltage protection system for a saddle type vehicle as claimed in claim 1, wherein said high voltage protection circuit comprises a first bipolar junction transistor and a second bipolar junction transistor wherein said first bipolar junction transistor remains ON when said second bipolar junction transistor being OFF or said first bipolar junction transistor remains OFF when said second bipolar junction transistor being ON.

6. The high voltage protection system for a saddle type vehicle as claimed in claim 3, wherein said potential divider circuit comprises a low pass filter resistor and a capacitor.

7. The high voltage protection system for a saddle type vehicle as claimed in claim 1, wherein said fault detection circuit comprises of a comparator;
    wherein, a positive polarity of said comparator receives an input from the fault collection circuit.

8. The high voltage protection system for a saddle type vehicle as claimed in claim 1, wherein a negative polarity of said comparator receives a threshold voltage from a threshold voltage generator circuit.

9. A method of protecting a vehicle from a high voltage comprising step of:
    receiving an input voltage by a high voltage protection circuit;
    comparing said input voltage;
    receiving one or more input signals from one or more input switches by a fault collection circuit;
    checking for a short circuit;
    reducing said one or more input signals by a potential divider;
    receiving a fault collection circuit output from said fault collection circuit;
    comparing said fault collection circuit output with a threshold voltage; and
    disabling said vehicle when said fault collection circuit output being greater than said threshold voltage.

\* \* \* \* \*